United States Patent
Liu et al.

(10) Patent No.: US 7,289,056 B2
(45) Date of Patent: Oct. 30, 2007

(54) WIRELESS COMMUNICATION SYSTEM AND METHOD OF OPERATING IN THE PRESENCE OF A RADAR SYSTEM

(75) Inventors: Jiewen Liu, San Diego, CA (US); Chih C. Tsien, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 11/088,367

(22) Filed: Mar. 24, 2005

(65) Prior Publication Data

US 2006/0214837 A1 Sep. 28, 2006

(51) Int. Cl.
*G01S 13/00* (2006.01)
*G01S 3/02* (2006.01)
*H04Q 1/00* (2006.01)

(52) U.S. Cl. .................. 342/52; 370/338; 342/465

(58) Field of Classification Search ............. 342/357; 455/422.1
See application file for complete search history.

(56) References Cited

U.S. PATENT DOCUMENTS 6,094,575 A * 7/2000 Anderson et al. ........ 455/422.1
2004/0028123 A1 * 2/2004 Sugar et al. .............. 375/224
2004/0047324 A1 * 3/2004 Diener .................... 370/338
2004/0137915 A1 * 7/2004 Diener et al. ............ 455/456.1
2005/0093745 A1 * 5/2005 Krumm et al. ............ 342/465
2005/0171720 A1 * 8/2005 Olson et al. .............. 702/121
2006/0075131 A1 * 4/2006 Douglas et al. .......... 709/230

* cited by examiner

*Primary Examiner*—Thomas Tarcza
*Assistant Examiner*—Harry Liu
(74) *Attorney, Agent, or Firm*—Schwegman, Lundberg & Woessner, P.A.; Gregory J. Gorrie

(57) ABSTRACT

A managing wireless communication device assigns channels of a channel set to associated wireless communication devices. The associated wireless communication devices monitor the assigned channels for in-band signals including radar signals and report detections to the managing wireless communication device. The managing wireless communication device resets a timer associated with a channel when a report is received from one of the associated wireless communication devices. The timer may indicate how long the associated channel has been radar free.

33 Claims, 4 Drawing Sheets

WIRELESS COMMUNICATION SYSTEM AND METHOD OF OPERATING IN THE PRESENCE OF A RADAR SYSTEM

TECHNICAL FIELD

Some embodiments of the present invention pertain to wireless communication systems, some embodiments pertain to wireless local area networks, and some embodiments pertain to multicarrier communication systems.

BACKGROUND

Many electronic communications systems share their frequency spectrum with other electronic systems. For example, some wireless local area networks (WLANs) and C-band radar systems both operate within a 5 GHz spectrum. These radar systems may be important for both military and commercial uses, including national security and air traffic control, and therefore WLANs should avoid the use of frequencies being used by such in-band radar systems.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
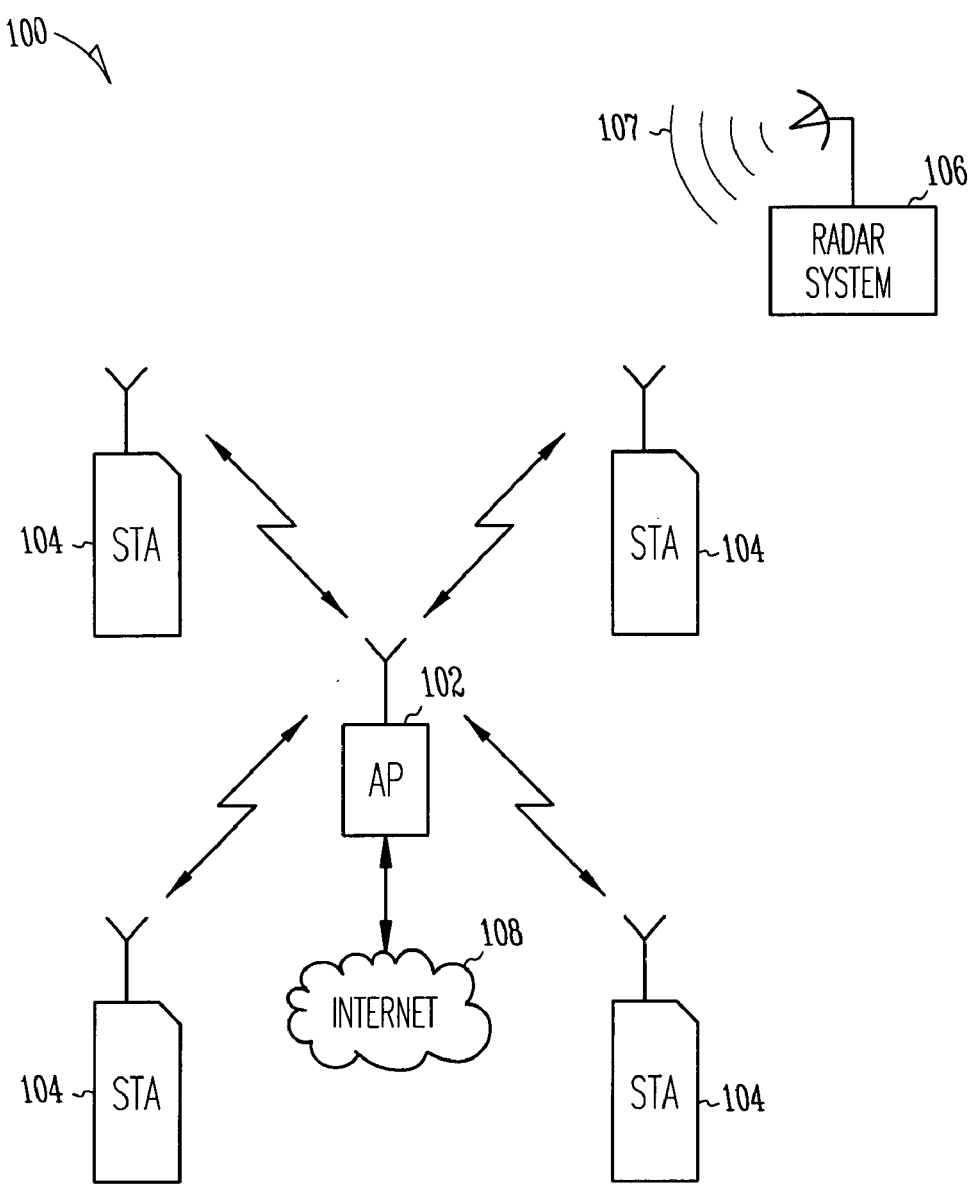
FIG. 1 illustrates a wireless network in accordance with some embodiments of the present invention.

FIG. 1 illustrates a wireless network in accordance with some embodiments of the present invention. Wireless network 100 may illustrate an operational environment of a wireless local area network (WLAN) that may include access point (AP) 102 which may communicate with one or more communication stations (STAs) 104. Access point 102 and/or communication stations 104 may be referred to as wireless communication devices; however the scope of the invention is not limited to WLAN embodiments. In some embodiments, for example, access point 102 may be referred to as a managing wireless communication device and communication stations 104 may be referred to as associated communication devices. In some embodiments, access point 102 may allow communication stations 104 to communicate with networks such as Internet 108, while in other embodiments; access point 102 may allow communication stations 104 to communicate with each other through access point 102.

Radar systems, such as radar system 106, often perform far more critical and crucial tasks related to military, national security and safety. In many cases, it may be important to protect a radar signal from interference by other communication systems, such as a WLAN. In accordance with some regulatory requirements of the Federal Communication Commission (FCC) and the European Telecommunication Standards Institute (ETSI), for example, wireless communication networks operating in the 5 GHz band may be required to have a dynamic frequency selection (DFS) and a radar detection mechanism with a very high radar detection probability (e.g., greater than or equal to 95%). These standards may also require that once the signal strength of a radar system at a device's antenna port exceeds a predetermined threshold, the network shall move to another frequency channel which has been radar free for at least a defined period of time, such as sixty seconds. A threshold for international telecommunication union (ITU) channels, in some cases, may be either −62 dBm or −64 dBm, although the scope of the invention is not limited in these respects.

To meet these requirements, a WLAN system may scan all ITU channels of the 5.25 to 5.725 GHz band periodically for radar signal detection and radar-free channel measurements. In some cases, a WLAN system may perform fast scanning of the ITU channels because radar signals may be frequency hopping signals. In order to detect a radar signal accurately and promptly, the measurement and detection may be performed at a very high frequency. For example, in an ITU channel set, there may be about 15 channels in the 5.25 to 5.725 GHz frequency band. Wideband scanning for radar signal detection and measurement over a 500 MHz bandwidth, for example, requires significant processing resources of the access point of a WLAN system.

In some embodiments of the present invention, network 100 may operate in a BSS (Basic Service Set) mode in which access point 102 is a central access point for WLAN operations. A BSS may include access point 102 and associated communication stations 104. In a BSS mode, communications between access point 102 and the associated communication stations 104 may take place over one communication channel of the channel set which may be selected by the access point. In these embodiments, access point 102 may be the central controller responsible for radar detection and radar-free channel selection as well. Conventionally, an access point may need to perform all radar detections and measurements while fully supporting normal WLAN operations. This extra work load requires additional operation cycles that may significantly impact the WLAN's network performance, especially in a heavy traffic situation. For example, an access point may need to stop the current channel operations and tune to different channels frequently for radar detections and measurements. As can be seen, it may be difficult for an access point to maintain network throughput and network capacity while supporting the radar detection and measurement requirements of some standards all by itself.

In accordance with some embodiments of the present invention, access point 102 may operate in the presence of radar system 106. In these embodiments, access point 102 may refrain from communicating on channels in which radar signals 107 are detected for at least a predetermined period time. In this way, channels used by access point 102 may be radar-free for a certain amount of time before being used. In accordance with some embodiments, access point 102 assigns unused wireless channels of a channel set to communication stations 104 that are currently associated with access point 102. In some embodiments, the channels may be channels of an ITU channel set within a 5.25 GHz to 5.725 GHz frequency band, although the scope of the invention is not limited in this respect. In some embodiments, unused channels may refer to any channel that access point is not using to communicate with communication stations 104. In some embodiments, unused channels may refer to all channels of a channel set except a current operating channel. In some embodiments, unused channels may refer to any frequency not being used within a predetermined frequency band. Communication stations 104 may monitor their assigned channels for radar signals 107. In some embodiments, communication stations 104 may monitor their assigned channels in predetermined frequency bandwidths, such as 500 MHz bandwidths, although the scope of the invention is not limited in this respect.

Access point 102 may receive reports from one or more of communication stations 104 when a radar signal 107 is detected on any of the channels. The reports may indicate which of the unused channels the radar signal has been detected on. In response to receipt of a report, access point 102 may reset a timer for the channel when a report is received from one of communication stations 104 indicating that a radar signal has been detected on that unused channel.

In some embodiments, the unused channels of the channel set may be assigned to communication stations 104 currently communicating with access point 102 over a current operating channel. These stations may be referred to as associated communication stations and may be part of the BSS. In some embodiments, one or more of communication stations 104 may also monitor the current operating channel. The timer for a channel may count down for a period of time to indicate when the channel should not be used. In some embodiments, access point 102 may further maintain a radar-free channel database of radar-free channels of the channel set. In some embodiments, access point 102 may add a channel to the radar-free channel database after expiration of the timer associated with the channel. These embodiments, as well as other embodiments, are discussed in more detail below.

In some embodiments, communication stations 104, as well as access point 102, may monitor channels of the channel set for any signal, such as interfering signals, including the use of one of the channels by another access point (i.e., another BSS) operating nearby. In this way, access point 102 may be able to use a different operating channel and reduce interference between neighboring access points, although the scope of the invention is not limited in this respect. Furthermore, access point 102 may be able to avoid using channels with interference and noisy channels, although the scope of the invention is not limited in this respect.

Figure 2:
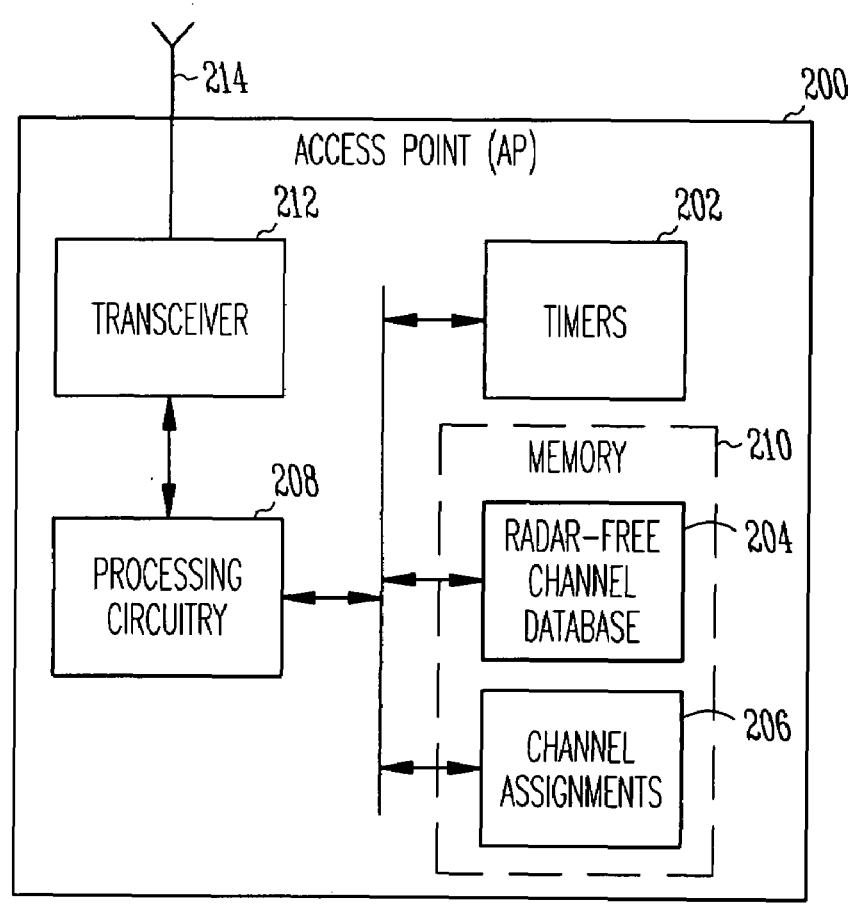
FIG. 2 is a block diagram of an access point in accordance with some embodiments of the present invention.

FIG. 2 is a block diagram of an access point in accordance with some embodiments of the present invention. Access point 200 may be suitable for use as access point 102 (FIG. 1), although other access points may also be suitable. In accordance with some embodiments, access point 200 comprises transceiver 212 to communicate with one or more communication stations 104 (FIG. 1) using antenna 214. Access point 200 may also include processing circuitry 208 to, among other things, assign channels of a channel set to communication stations currently associated with access point 200. In response to the assignment of channels, the communication stations may monitor their assigned channels for radar signals 107 (FIG. 1). Access point 200 may also comprise a plurality of timers 202. One of timers 202 may be set and associated with one of the channels and may be updated when a report is received from one of the communication stations indicating whether a radar signal has been detected on the associated channel. In some embodiments, a communication station may send reports to access point 200 indicating that no radar signals have been detected on the station's assigned channels and/or the current operating channel, although the scope of the invention is not limited in this respect. In some IEEE 802.11(h) embodiments discussed in more detail below, a channel may not be available for use until after expiration of its timer. In these embodiments, a set timer allows a channel to be marked as unavailable for a certain period of time once a radar signal is detected on the channel. In some embodiments, a channel of an ITU channel set may be unavailable for use by access point for a predetermined period time that may range from 60 seconds to up to 24 hours or more after a radar signal has been detected thereon.

In accordance with some embodiments, transceiver 212 may transmit the assignment of channels selectively to the communication stations and may receive reports from the communication stations when a radar signal is detected on any one of the channels. The reports may be received from any one of the communication stations on the current operating channel and the reports may indicate which channel the radar signal had been detected on.

In some embodiments, access point 200 may further comprise memory 210 to store channel assignments 206 and to further store radar-free channel database 204. Radar-free channel database 204 may identify which of the channels have been radar-free for at least a predetermined period of time. Channel assignments 206 may indicate which channels of the channel set are being monitored by which of the associated communication stations 104 (FIG. 1).

In some embodiments, processing circuitry 208 may add a channel to radar-free channel database 204 after expiration of an associated timer 202 indicating that the channel has been radar-free for a predetermined period of time. In some embodiments, processing circuitry 208 may update radar-free channel database 204 once every beacon interval, although the scope of the invention is not limited in this respect. A beacon interval may refer to how often access point 200 transmits beacon signals, which may be around 100 ms, however a beacon interval may range, for example, from 20 ms to 1 minute.

In some embodiments, transceiver 212 may communicate with communication stations 104 (FIG. 1) over a current operating channel of a channel set while the communication stations concurrently monitor their assigned channels of the channel set. In some embodiments, communication stations 104 (FIG. 1) may also monitor the current operating channel for radar signals 107 (FIG. 1) and may report to the access point when a radar signal is detected on the current operating channel. Because the communication stations may be located in different geographic locations, any one of the stations, such as the closest station, may be able to better detect an operating radar system on channels of the channel set, although the scope of the invention is not limited in this respect.

In some embodiments, when access point 200 receives a report indicating that a radar signal is detected on the current operating channel, processing circuitry 208 may select a new operating channel from radar-free database 204. Access point 200 may then assign the selected new operating channel to all associated communication stations (e.g., stations in the BSS) and may instruct the associated stations to switch to the new operating channel. In this way, access point 200 may continue to operate in the presence of radar system 106 (FIG. 1) without interfering with radar system 106 (FIG. 1). In some embodiments, communication stations 104 (FIG. 1) may monitor the current operating channel for radar signals during a quiet period. The quiet period may be a time period between communications (e.g., frames or packets) when neither the access point nor any of the associated communication station are communicating on the current operating channel.

Figure 3:
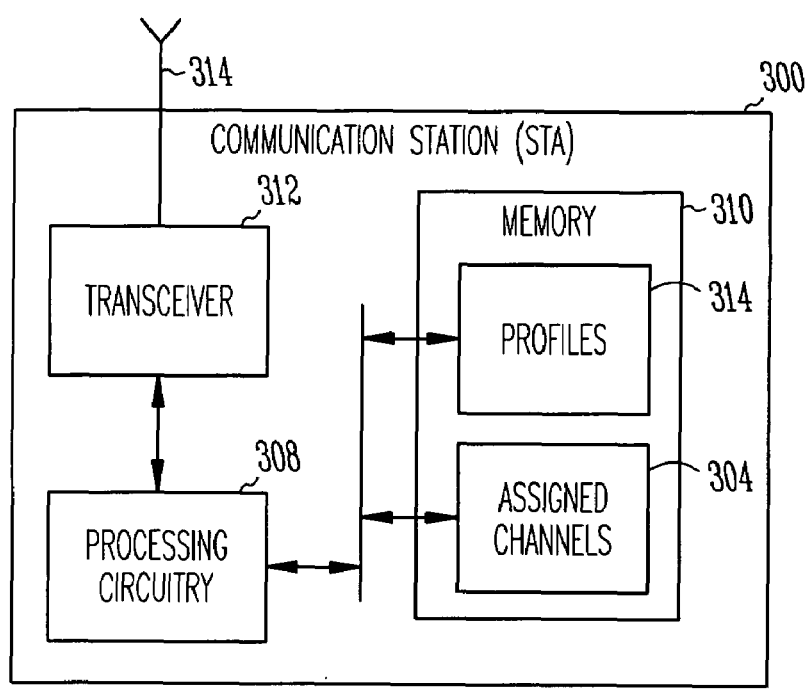
FIG. 3 is a block diagram of a communication station in accordance with some embodiments of the present invention.

FIG. 3 is a block diagram of a communication station in accordance with some embodiments of the present invention. Communication station 300 may be suitable for use as any one of communication stations 104 (FIG. 1), although other configurations of communication stations may also be suitable. Communication station 300 may comprise multicarrier transceiver 312 for communicating with other wireless communication devices, such as access point 102 (FIG. 1) as well as other communication stations, using one or more antennas 314.

Communication station 300 may also comprise processing circuitry 308 coupled with transceiver 312 for performing the operation described herein, among other things. Communication station 300 may also comprise memory 310 for storing information related to the operation of communication station 300. In some embodiments, memory 310 may store assigned channels 304, which may include a current operating channel as well as unused channels assigned by an access point to monitor for radar signals.

In some embodiments, multichannel transceiver 312 may be capable of communicating on any channel of the channel set and may be further capable of concurrently monitoring any of the channels of the channel set for radar signals. In some embodiments, communication station 300 may compare detected signals on channels with profiles 314 associated with standard, conventional or known radar signals. Profiles 314 may include a pulse-width profile, a pulse-bandwidth profile, a pulse-repetition-rate (PRR) profile, and/or a repetitive pulse-train profile. In some embodiments, processing circuitry 308 may compare these known profiles, with received signals, although the scope of the invention is not limited in this respect. In some embodiments, radar signals 107 (FIG. 1) may be low-duty cycle signals compared to WLAN signals, which may have higher duty cycles. In some embodiments, radar signals 107 (FIG. 1) may have a periodic pulse rate, while WLAN signals may have a more random pulse rate. In these ways, among others, communication station 300 may easily distinguish between radar signals 107 (FIG. 1) and other signals such as WLAN signals. In some embodiments, a radar signal may have to exceed a predetermined power level, such as −62 dBm or −64 dBm, before a communication station would report it as a detection. In some embodiments, processing circuitry 308 may distinguish between other in-band signals, such as signals from cordless telephones, security systems, etc., although the scope of the invention is not limited in this respect.

Referring to FIG. 2, in some embodiments, access point 200 may also detect radar signals on one or more of the channels of the channel set. In these embodiments, transceiver 212 may not only be capable of communicating on any channel of the channel set, transceiver 212 may be further capable of concurrently monitoring any of the channels of the channel set for radar signals. In some embodiments, processing circuitry 208 may compare detected signals on channels with profiles associated with standard, conventional or known radar signals.

In some embodiments, processing circuitry 208 may assign channels for monitoring based on a total number of the unused channels divided by a number of associated communication stations 104 (FIG. 1) available to perform the monitoring. In some embodiments, a channel assignment algorithm may be employed. In some embodiments, a fairly uniform number of channels may be assigned to each communication station 104 (FIG. 1), although the scope of the invention is not limited in this respect. In some of these embodiments, a communication station may be assigned a portion of a frequency band rather than particular channels, although the scope of the invention is not limited in this respect.

In some embodiments, a communication station may inform access point 200 that it unable to perform the requested monitoring for radar signals. In these embodiments, channels may be assigned to other communication stations that are capable of monitoring. In some embodiments, in response to the assignment of channels for monitoring, a communication station may indicate to the access point that it is able to perform the monitoring on the assigned channels. In some embodiments, the assignment of communication channels may include a request to monitor specific channels for radar signals, although the scope of the invention is not limited in this respect. In some embodiments, messages in accordance with the IEEE 802.11(h) standard may be sent to communication stations 104 (FIG. 1) to request radar signal measurements, although the scope of the invention is not limited in this respect.

In some embodiments, each timer 202 for a particular unused channel may count down from a predetermined value. Upon expiration of the associated timer, processing circuitry 208 may add the channel associated with the timer to radar-free channel database 204. The added unused channel may become available for assignment and use by access point 102 (FIG. 1) for communication with communication stations 104 (FIG. 1). In some embodiments, processing circuitry 208 may reset a timer for an associated channel that currently has an active timer when a radar signal is detected by one of the communication stations on the associated channel. This will help ensure that a channel is radar-free for at least a period of time associated with a maximum value of its timer.

Antennas 214 (FIG. 2) and antenna 314 (FIG. 3) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, access point 200 (FIG. 2) and communication station 300 (FIG. 3) may use more than one antenna.

Although access point 200 (FIG. 2) and communication station 300 (FIG. 3) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of access point 200 (FIG. 2) and communication station 300 (FIG. 3) may refer to one or more processes operating on one or more processing elements.

In some embodiments, access point 200 (FIG. 2) and/or communication station 300 (FIG. 3) may be part of a portable wireless communication device, such as personal digital assistant (PDA), a laptop or portable computer with wireless communication capability, a web tablet, a wireless telephone, a wireless headset, a pager, an instant messaging device, a digital camera, a television or other device that may receive and/or transmit information wirelessly. In some embodiments, access point 200 (FIG. 2) and/or communication station 300 (FIG. 3) may be part of a communication station or terminal.

In some embodiments, access point 200 (FIG. 2) and communication station 300 (FIG. 3) may receive and transmit orthogonal frequency division multiplexed (OFDM) communication signals and may communicate over a multicarrier communication channel. The multicarrier communication channel may be within a predetermined frequency spectrum and may comprise a plurality of orthogonal subcarriers which may convey one or more OFDM symbols. In some embodiments, the multicarrier communication signals communicated by access point 200 (FIG. 2) and communication station 300 (FIG. 3) may be within a 5 GHz frequency spectrum, which may include frequencies ranging from approximately 4.9 to 5.9 GHz, although the scope of the invention is not limited in this respect, as other frequency spectrums are also equally suitable. In some broadband and WiMax embodiments, the frequency spectrum for communications between access point 200 (FIG. 2) and communication station 300 (FIG. 3) may comprise frequencies between 2 and 11 GHz, although the scope of the invention is not limited in this respect.

In some embodiments, access point 200 (FIG. 2) and communication station 300 (FIG. 3) may communicate in accordance with specific communication standards, such as the Institute of Electrical and Electronics Engineers (IEEE) standards including IEEE 802.11(a), 802.11(b), 802.11(g), 802.11(h) and/or 802.11(n) standards for wireless local area networks (WLANs), although the scope of the invention is not limited in this respect. In some broadband and WiMax embodiments, access point 200 (FIG. 2) and communication station 300 (FIG. 3) may communicate broadband wireless communications in accordance with the IEEE 802.16(e) standards for wireless metropolitan area networks (WMANs).

Figure 4:
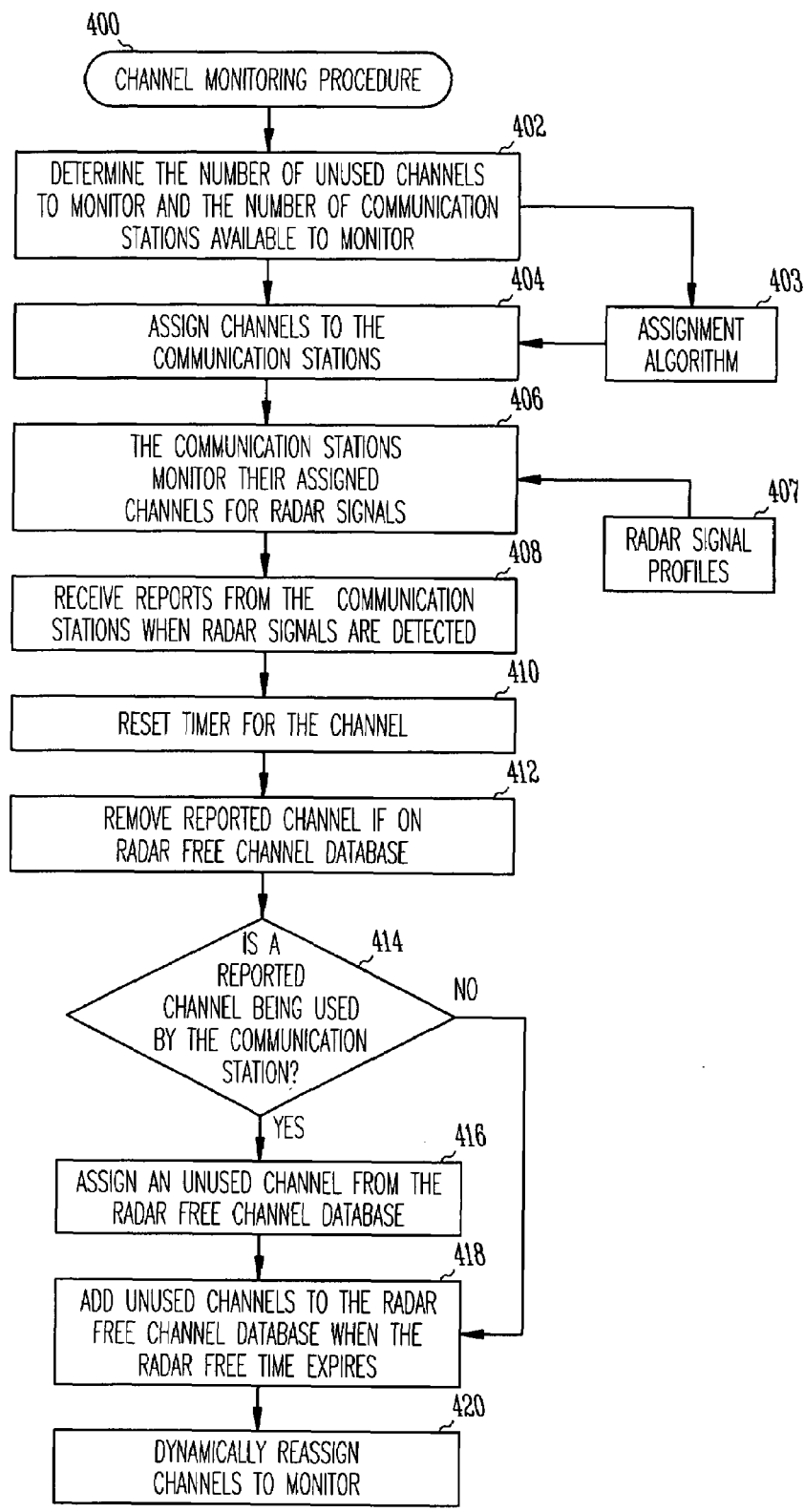
FIG. 4 is a flow chart of a channel monitoring procedure in accordance with some embodiments of the present invention.

FIG. 4 is a flow chart of a channel monitoring procedure in accordance with some embodiments of the present invention. Channel monitoring procedure 400 may be performed by an access point, such as access point 200 (FIG. 2) for the detection of radar signals by individual communication stations 104 (FIG. 1) to allow access point 200 (FIG. 2) to operate within the presence of an active radar system. Although the individual operations of procedure 400 are illustrated and described as separate operations, one or more of the individual operations may be performed concurrently, and nothing requires that the operations be performed in the order illustrated.

Operation 402 comprises determining the number of channels of a channel set to monitor and the number of communication stations that are available to perform monitoring for radar signals. The channels may be unused channels of the channel set, although the scope of the invention is not limited in this respect. This information may be provided to channel assignment algorithm 403.

Operation 404 comprises assigning the channels to communication stations currently associated with the access point. The channels may be assigned in accordance with channel assignment algorithm 403. In some embodiments, channel assignment algorithm 403 may assign a fairly uniform number of channels to each associated communication station, although the scope of the invention is not limited in this respect. In some embodiments, operation 404 may also comprise requesting one or more of the associated communication stations to monitor the current operating channel.

During operation 406, the assigned channels may be monitored by the communication stations. In some embodiments, the communication stations may use radar signal profiles 407 to help identify radar signals within their assigned channels. In some embodiments, one or more of the associated communication stations may also monitor the current operating channel for radar signals. When radar signals are detected, the communication stations may send reports to the access point indicating the presence of a radar signal. In some embodiments, the access point may also monitor one or more channels of the channel set and may further monitor the current operating channel for radar signals, although the scope of the invention is not limited in this respect.

Operation 408 comprises receiving reports from the communication stations when radar signals are detected. The reports may indicate which channel of the channel set that a radar signal has been detected on. In some embodiments, a report may be received for any of the unused channels of the channel set as well as for the current operating channel.

Operation 410 comprises resetting a timer associated with the channel that a radar signal has been detected on.

Operation 412 comprises removing a channel from the radar-free channel database when a radar signal is reported on that channel in operation 410.

In operation 414, when a radar signal is reported on the current operating channel, operation 416 is performed. In operation 416, an unused channel is selected by the access point for use by the BSS (i.e., access point and the associated communication stations) and communications may be switched to the new channel. In some embodiments, the new channel for operating may be assigned from the radar-free channel database, although the scope of the invention is not limited in this respect.

Operation 418 comprises adding unused channels to the radar-free channel database when the timer associated with the channel expires. Operation 418 may, for example, be performed anytime during procedure 400.

Operation 420 comprises dynamically reassigning channels to communication stations as the number of communication stations associated with the access point change. In some embodiments, channel assignments may be rotated to allow radar signals to be monitored on the different channels at various locations, although the scope of the invention is not limited in this respect.

Referring back to FIG. 1, in some embodiments, access point 102 may operate in a BSS mode in which it communicates with communication stations 104 over a current operating channel of a predetermined set of channels. In some embodiments, access point 102 offloads radar detection and measurement tasks to at least some of communication stations 104 that are associated with access point 102 to help ensure that access point 102 is able to perform in networking operations. In this way, the network performance of access point 102 may not be necessarily degraded by having to monitor for radar totally by itself.

In some embodiments, the offloading of the radar-monitoring tasks by access point 102 may be done fairly uniformly. For example, when there are five communication stations 104 associated with access point 102, the unused channels that need to be monitored may be divided into five groups and assigned to each of communication stations 104. Each group does not need to have the same number of channels.

In some embodiments, when there is less than a predetermined number of communication stations 104 available to perform monitoring (e.g., three) access point 102 may decide to monitor some of the channels itself because access point 102 may have to handle less traffic. The more communication stations 104 that are currently associated with access point 102, the more traffic that access point 102 generally may handle, reducing its ability to perform monitoring itself.

However, more communication stations 104 may allow each communication station 104 to monitor fewer communication channels. This may allow a greater number of communication stations 104 to more frequently perform measurement and detection of radar. In some embodiments, access point 102 may completely offload all radar-signal detections and measurements including radar-signal detections and measurements for the current operating channel to the associated communication stations when there are more than a predetermined number of communication stations 104, although the scope of the invention is not limited in this respect. In this way, an access point may better support networking operations and maintain its network performance without a noticeable impact due to radar detection and measurements.

In some embodiments, a simple and efficient interaction of detections and measurements may occur between access point 102 and associated communication stations 104. Specific channel numbers may be assigned to associated communication stations 104, and the communication stations may begin their detections and measurements. In some embodiments, no report is sent to access point 102 until a radar signal is detected either on the current operating channel or on one of the unused channels. In some embodiments, access point 102 maintains radar-free channel database 204 (FIG. 2), in which each channel may be associated with one of timers 202 (FIG. 2) that may indicate for how long the channel has been radar-free. In some embodiments, a channel may be radar-free at least 60 seconds, for example, before it is considered a radar-free channel and available for use. When a radar signal is detected on a channel, the timer associated with the channel may be reset. When a radar signal is detected on the current operating channel, access point 102 may select the best candidate from radar-free channel database 204 (FIG. 2) and may announce channel switching to the associated communication stations in the BSS. The best candidate channel may be a channel that has been radar free for the longest period of time, although the scope of the invention is not limited in this respect.

In some embodiments, the channel grouping and the number of channels monitored per communication station may be changed dynamically, for example, when any communication station joins and/or leaves the BSS, or if a communication station's traffic situation becomes unbalanced. For example, the channels that are being monitored by a first communication station may be temporarily reassigned to a second communication station when the second communication is not busy or idle in a current time frame. In some embodiments, channel groups may be rotated among the associated communication stations to help ensure that a channel is measured at the various locations within the BSS, although the scope of the invention is not limited in this respect. For example, a first group of unused channels may be assigned to a first communication station during one time period and may be assigned to a second station during a at next time period. In this way, radar signals may be detected on each channel at each location in the BSS.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A managing wireless communication device comprising:
   processing circuitry to assign one or more different channels of a channel set to associated wireless communication devices, wherein the associated wireless communication devices are to monitor the assigned channels for in-band signals including radar signals; and
   a plurality of timers associated with channels of the channel set, the timers indicating how long an associated channel has been at least one of either in-band signal free or radar-free,
   wherein the associated wireless communication devices refrain from monitoring unassigned channels of the channel set for in-band signals including radar signals.

2. The managing wireless communication device of claim 1 wherein when a report is received from one of the associated wireless communication devices indicating that either an in-band signal or a radar signal has been detected on one of the channels, the processing circuitry is to reset the timer associated with the one channel.

3. The managing wireless communication device of claim 1 wherein the processing circuitry is to rotate channel assignments among the associated wireless communication devices to help ensure that at least one of either in-band signals or radar signals are monitored at various geographic locations.

4. The managing wireless communication device of claim 1 further comprising a transceiver to transmit the assigned channels selectively to the associated wireless communication devices,
wherein the transceiver is to further receive reports from the associated wireless communication devices when either an in-band signal or a radar signal is detected on any one of the channels, the reports to indicate which of the channels the at least one of either in-band signal or radar signal had been detected on.

5. The managing wireless communication device of claim 1 further comprising:
a memory to store a signal-free channel database identifying the channels that have been signal-free for a predetermined period of time,
wherein the processing circuitry is to add one of the channels to the signal-free database after expiration of an associated one of the timers.

6. A managing wireless communication device comprising:
processing circuitry to assign channels of a channel set to associated wireless communication devices, wherein the associated wireless communication devices are to monitor the assigned channels for in-band signals including radar signals;
a plurality of timers associated with channels of the channel set, the timers indicating how long an associated channel has been at least one of either in-band signal free or radar-free,
a memory to store a signal-free channel database identifying the channels that have been signal-free for a predetermined period of time,
a transceiver to communicate with the associated wireless communication devices over a current operating channel,
wherein the processing circuitry is to add one of the channels to the signal-free database after expiration of an associated one of the timers, and
wherein the associated wireless communication devices are to further monitor the current operating channel for at least one of either in-band signals or radar signals and are to report to the managing wireless communication device when either an in-band signal or a radar signal is detected on the current operating channel.

7. The managing wireless communication device of claim 6 wherein when the managing wireless communication device receives a report indicating that either an in-band signal or a radar signal is detected on the current operating channel, the processing circuitry is to select a new operating channel from the signal-free database and is to instruct the associated wireless communication devices to switch to the new operating channel for subsequent communications.

8. The managing wireless communication device of claim 6 wherein the managing wireless communication device and the associated wireless communication devices are to monitor the current operating channel for at least one of either in-band signals or radar signals during a quiet period, and
wherein the processing circuitry is to update the signal-free channel database once every beacon interval.

9. A managing wireless communication device comprising:
processing circuitry to assign channels of a channel set to associated wireless communication devices, wherein the associated wireless communication devices are to monitor the assigned channels for in-band signals including radar signals; and
a plurality of timers associated with channels of the channel set, the timers indicating how long an associated channel has been at least one of either in-band signal free or radar-free,
wherein the associated wireless communication devices are to compare detected signals on the assigned channels with profiles associated with radar signals, the profiles comprising at least one of a pulse-width profile, a pulse-bandwidth profile, a pulse-repetition-rate profile, and a repetitive pulse-train profile.

10. A managing wireless communication device comprising:
processing circuitry to assign channels of a channel set to associated wireless communication devices, wherein the associated wireless communication devices are to monitor the assigned channels for in-band signals including radar signals; and
a plurality of timers associated with channels of the channel set, the timers indicating how long an associated channel has been at least one of either in-band signal free or radar-free,
wherein the processing circuitry is to assign the channels for monitoring based on a total number of the channels divided by a number of the associated wireless communication devices available to perform the monitoring.

11. The managing wireless communication device of claim 10 further comprising a transceiver to receive a message from one of the associated wireless communication devices indicating that the one associated wireless communication device is unable to perform monitoring on the assigned channels.

12. A method comprising:
assigning one or more different channels of a channel set to associated wireless communication devices currently associated with a managing wireless communication device, the associated wireless communication devices to monitor the assigned channels for at least one of either in-band signals or radar signals; and
resetting a timer for one of the channels when a report is received from one of the associated wireless communication devices indicating that either an in-band signal or a radar signal has been detected on the one channel,
wherein the associated wireless communication devices refrain from monitoring unassigned channels of the channel set for in-band signals including radar signals.

13. The method of claim 12 further comprising receiving reports from one or more of the associated wireless communication devices when either an in-band signal or a radar signal is detected on any of the channels, the report indicating which channel either an in-band signal or a radar signal has been detected on.

14. The method of claim 12 further comprising rotating channel assignments among the associated wireless communication devices to help ensure that at least one of either in-band signals or radar signals are monitored at various geographic locations.

15. The method of claim 12 wherein the method further comprises:
maintaining, by the managing wireless communication device, a signal-free channel database of signal-free channels of the channel set, the signal-free channel database identifying channels that have been signal-free for a predetermined period of time; and adding one of the channels to the signal-free channel database after expiration of the timer associated with the one channel.

16. A method comprising:

assigning channels of a channel set to associated wireless communication devices currently associated with a managing wireless communication device, the associated wireless communication devices to monitor the assigned channels for at least one of either in-band signals or radar signals;

resetting a timer for one of the channels when a report is received from one of the associated wireless communication devices indicating that either an in-band signal or a radar signal has been detected on the one channel;

maintaining, by the managing wireless communication device, a signal-free channel database of signal-free channels of the channel set, the signal-free channel database identifying channels that have been signal-free for a predetermined period of time;

adding one of the channels to the signal-free channel database after expiration of the timer associated with the one channel; and communicating, by the managing wireless communication device with the associated wireless communication devices, over a current operating channel during the monitoring of the channels by the associated wireless communication devices, wherein the associated wireless communication devices are to further monitor the current operating channel for at least one of either in-band signals or radar signals and are to transmit a report to the managing wireless communication device when either an in-band signal or a radar signal is detected on the current operating channel.

17. The method of claim 16 wherein when either an in-band signal or a radar signal is detected on the current operating channel, the method further comprises:

selecting a new operating channel from the signal-free database; and instructing the associated wireless communication devices to switch to the new operating channel for subsequent communications with the managing wireless communication device.

18. The method of claim 16 comprising:

monitoring the current operating channel for either an in-band signal or a radar signal by the associated wireless communication devices and the managing wireless communication device during a quiet period; and updating, by the managing wireless communication device, the signal-free channel database once every beacon interval.

19. A method comprising:

assigning channels of a channel set to associated wireless communication devices currently associated with a managing wireless communication device, the associated wireless communication devices to monitor the assigned channels for at least one of either in-band signals or radar signals; and resetting a timer for one of the channels when a report is received from one of the associated wireless communication devices indicating that either an in-band signal or a radar signal has been detected on the one channel, wherein the associated wireless communication devices are to compare detected signals on the assigned channels with profiles associated with radar signals, the profiles comprising at least one of a pulse-width profile, a pulse-bandwidth profile, a pulse-repetition-rate profile, and a repetitive pulse-train profile.

20. A method comprising:

assigning channels of a channel set to associated wireless communication devices currently associated with a managing wireless communication device, the associated wireless communication devices to monitor the assigned channels for at least one of either in-band signals or radar signals; and resetting a timer for one of the channels when a report is received from one of the associated wireless communication devices indicating that either an in-band signal or a radar signal has been detected on the one channel, wherein assigning the channels comprises assigning a number of the channels of the set to the associated wireless communication devices for monitoring based on a total number of the channels divided by a number of the associated wireless communication devices available to perform the monitoring.

21. The method of claim 20 further comprising, after assigning the channels, receiving a message from one of the associated wireless communication devices indicating that the one associated wireless communication device is unable to perform the monitoring on the assigned channels.

22. A method comprising:

assigning channels of a channel set to associated wireless communication devices currently associated with a managing wireless communication device, the associated wireless communication devices to monitor the assigned channels for at least one of either in-band signals or radar signals; and resetting a timer for one of the channels when a report is received from one of the associated wireless communication devices indicating that either an in-band signal or a radar signal has been detected on the one channel, wherein the timer counts down from a predetermined value, and wherein upon expiration of the timer, the method comprises adding the channel associated with the timer to the signal-free channel database, the added channel becoming available for assignment and use.

23. The method of claim 22 further comprising resetting the timer for an associated channel that currently has an active timer when a radar signal is detected by one of the associated wireless communication devices on the associated channel.

24. A method comprising:

assigning channels of a channel set to associated wireless communication devices currently associated with a managing wireless communication device, the associated wireless communication devices to monitor the assigned channels for at least one of either in-band signals or radar signals; and resetting a timer for one of the channels when a report is received from one of the associated wireless communication devices indicating that either an in-band signal or a radar signal has been detected on the one channel, wherein further comprising dynamically reassigning channels of the channel set for detection of at least one of either in-band signals or radar signals by the associated wireless communication devices as a number of associated wireless communication devices associated with the managing wireless communication device change.

25. A system comprising:
an managing wireless communication device; and
a plurality of associated wireless communication devices which communicate with the managing wireless communication device over a current operating channel of a channel set,
wherein the managing wireless communication device comprises:
processing circuitry to assign one or more different channels of the channel set to the associated wireless communication devices; and
a plurality of timers associated with channels of the channel set, the timers indicating how long an associated channel has been signal-free, and
wherein the associated wireless communication devices are to monitor the assigned channels for at least one of either in-band signals or radar signals, and
wherein the associated wireless communication devices refrain from monitoring unassigned channels of the channel set for in-band signals including radar signals.

26. The system of claim 25 wherein when a report is received from one of the associated wireless communication devices indicating that either an in-band signal or a radar signal has been detected on one of the channels, the processing circuitry is to reset the timer associated with the one channel.

27. The system of claim 25 wherein the processing circuitry is to rotate channel assignments among the associated wireless communication devices to help ensure that at least one of either in-band signals or radar signals are monitored at various geographic locations.

28. A system comprising:
a substantially onmidirectional antenna;
a managing wireless communication device that communicates with a plurality of associated wireless communication devices using the antenna, wherein the managing wireless communication device comprises:
processing circuitry to assign one or more different channels of a channel set to the associated wireless communication devices currently associated with the wireless communication device; and
a plurality of timers associated with channels of the channel set, the timers indicating how long an associated channel has been signal-free,
wherein the associated wireless commnunication devices are to monitor the assigned channels for at least one of either in-band signals or radar signals, and
wherein the associated wireless commnunication devices refrain from monitoring unassigned channels of the channel set for in-band signals including radar signals.

29. The system of claim 28 wherein when a report is received from one of the associated wireless commnunication devices indicating that either an in-band signal or a radar signal has been detected on one of the channels, the processing circuitry is to reset the timer associated with the one channel.

30. The system of claim 28 wherein the processing circuitry is to rotate channel assignments among the associated wireless communication devices to help ensure that at least one of either in-band signals or radar signals are monitored at various geographic locations.

31. A machine-accessible medium that provides instructions, which when accessed, cause a machine to perform operations comprising:
assigning one or more different channels of a channel set to associated wireless communication devices currently associated with a wireless communication device, the associated wireless communication devices to monitor the assigned channels for at least one of either in-band signals or radar signals; and
resetting a timer for one of the channels when a report is received from one of the associated wireless communication devices indicating that either an in-band signal or a radar signal has been detected on the one channel,
wherein the associated wireless communication devices refrain from monitoring unassigned channels of the channel set for in-band signals including radar signals.

32. The machine-accessible medium of claim 31 wherein the instructions, when further accessed cause the machine to perform operations further comprising receiving reports from one or more of the associated wireless communication devices when either an in-band signal or a radar signal is detected on any of the channels, the report indicating which channel the at least one of either in-band signal or radar signal has been detected on.

33. The machine-accessible medium of claim 32 wherein the instructions, when further accessed cause the machine to perform operations further comprising rotating channel assignments among the associated wireless communication devices to help ensure that signals are monitored at various geographic locations.

* * * * *

UNITED STATES PATENT AND TRADEMARK OFFICE
CERTIFICATE OF CORRECTION

PATENT NO. : 7,289,056 B2  Page 1 of 1
APPLICATION NO. : 11/088367
DATED : October 30, 2007
INVENTOR(S) : Liu et al.

It is certified that error appears in the above-identified patent and that said Letters Patent is hereby corrected as shown below:

In column 15, line 33, in Claim 28, delete "onmidirectional" and insert -- omnidirectional --, therefor.

In column 15, line 45, in Claim 28, delete "commnunication" and insert -- communication --, therefor.

In column 16, line 1, in Claim 28, delete "commnunication" and insert -- communication --, therefor.

In column 16, lines 5-6, in Claim 29, delete "commnunication" and insert -- communication --, therefor.

Signed and Sealed this

First Day of April, 2008

JON W. DUDAS
*Director of the United States Patent and Trademark Office*